(12) United States Patent
Lin

(10) Patent No.: US 9,844,747 B2
(45) Date of Patent: Dec. 19, 2017

(54) MANUFACTURING METHOD FOR A FILTER CORE

(71) Applicant: PRO-PURE INC., New Taipei (TW)

(72) Inventor: Hsiang-Chi Lin, New Taipei (TW)

(73) Assignee: Pro-Pure Inc., New Taipei (TW)

( * ) Notice: Subject to any disclaimer, the term of this patent is extended or adjusted under 35 U.S.C. 154(b) by 297 days.

(21) Appl. No.: 14/612,324

(22) Filed: Feb. 3, 2015

(65) Prior Publication Data

US 2016/0151732 A1 Jun. 2, 2016

(30) Foreign Application Priority Data

Dec. 2, 2014 (TW) .............................. 103141732 A

(51) Int. Cl.
*B01D 46/52* (2006.01)
*B01D 46/00* (2006.01)

(52) U.S. Cl.
CPC ....... *B01D 46/521* (2013.01); *B01D 46/0001* (2013.01); *B01D 46/527* (2013.01)

(58) Field of Classification Search
None
See application file for complete search history.

(56) References Cited

U.S. PATENT DOCUMENTS

| 1,858,375 | A | * | 5/1932 | Schroeder | B31F 1/28 |
| | | | | | 156/473 |
| 5,090,281 | A | * | 2/1992 | Paulson | B24B 3/368 |
| | | | | | 83/13 |
| 2009/0127211 | A1 | * | 5/2009 | Rocklitz | B01D 46/525 |
| | | | | | 210/767 |
| 2014/0196422 | A1 | | 7/2014 | Lin et al. | |

FOREIGN PATENT DOCUMENTS

JP 60071018 A * 4/1985 ........... B01D 46/527

* cited by examiner

*Primary Examiner* — Barbara J Musser
(74) *Attorney, Agent, or Firm* — Alan D. Kamrath; Kamrath IP Lawfirm, P.A.

(57) ABSTRACT

A filter core has a wavy filtering sheet and a flat filtering sheet. The filtering sheets are for filtering suspended pollutants and respectively have multiple corrugations axially arranged apart from each other. Therefore, channels formed between the filtering sheets also have corrugations formed on inner walls of the channels after the filtering sheets are adhered. The corrugations on the inner walls of the channels are also axially arranged apart from each other and form concave and convex portions. As a result, when fluid, such as air, axially moves in the channels, the suspended pollutants on the fluid may hit, gather and accumulate on the corrugations, thereby slowing the fluid flow and providing one more filtering process. In addition, the corrugations on the filtering sheets also increase a filtering area. To sum up, the filter core can enhance the filtering effect.

10 Claims, 20 Drawing Sheets

MANUFACTURING METHOD FOR A FILTER CORE

CROSS-REFERENCE TO RELATED APPLICATIONS

This application is based upon and claims priority under 35 U.S.C. 119 from Taiwan Patent Application No. 103141732 filed on Dec. 2, 2014, which is hereby specifically incorporated herein by this reference thereto.

BACKGROUND OF THE INVENTION

1. Field of the Invention

The present invention relates to a filter core and manufacturing method thereof and, in particular, to a filter core for filtering suspended particles from fluid.

2. Description of the Prior Arts

A conventional filter core of a filtering device, such as U.S. patent application Ser. No. 14/063,497, comprises a wavy filtering layer and a flat filtering layer rolled into the shape of a cylinder and alternately stacked. Axial sealing adhesive layers are respectively coated along peaks of the wavy filtering layer to be adhered to the flat filtering sheet to enhance the connecting strength between the wavy filtering sheet and the flat filtering sheet. However, this conventional filtering core has the following shortcomings.

Multiple channels are formed between the wavy filtering sheet and the flat filtering sheet. End sealing adhesive layers are respectively adhered in ends in one of the axial sides of half of the channels and ends in another axial side of the other half of the channels. Thus, the fluid to be filtered, such as air, enters half of the channels from one axial side, moves to the other end of said channels, and hits the end sealing adhesive layer. Then, the fluid directly passes through the wavy filtering sheet or the flat filtering sheet to arrive at the other half of the channels, such that the fluid can flow out of the filter core. When the fluid passes through the wavy filtering sheet or the flat filtering sheet, the filtering sheet filters the fluid. However, the filter core filters the fluid only when the fluid passes through the filtering sheet. Thus, the filtering effect of the conventional filter core is insufficient.

Besides, during the forming process of some of the filter cores, when the wavy filtering sheet and the flat filtering sheet are adhered but are not rolled yet, the adhered filtering sheets are silt-cut. The adhered filtering sheets are cut along one of the end sealing adhesive layers to align with an outer surface of the end sealing adhesive layer and a side of the adhered filtering sheets, thereby effectively making use of an axial length of the filter core to maximize the filter core. However, the conventional slit-cutting method has the following shortcomings.

The conventional slit-cutting is done by a press cut, which is using a pressing blade to directly press downward to achieve the cutting. However, the movement of the press cut may flatten and deform the cut edge of the adhered filtering sheets, which makes the edge of the adhered filtering sheets and the edge of the rolled filter core uneven.

To overcome the shortcomings, the present invention provides a filter core and manufacturing method thereof to mitigate or obviate the aforementioned problems.

SUMMARY OF THE INVENTION

The main objective of the present invention is to provide a filter core and manufacturing method thereof that forms concave and convex portions on inner walls of channels of the filter core to enhance the filtering effect.

The filter core has a wavy filtering sheet, a flat filtering sheet, multiple axial sealing adhesive layers, and two end sealing adhesive layers. The wavy filtering sheet is for filtering suspended pollutants and has multiple corrugations and multiple peaks. The corrugations are formed on the wavy filtering sheet and are axially arranged apart from each other. The peaks are formed on the wavy filtering sheet and extend axially. The peaks and the corrugations of the wavy filtering sheet are perpendicular to each other in an extending direction. The flat filtering sheet is for filtering suspended pollutants and has multiple corrugations. The corrugations are formed on the flat filtering sheet and are axially arranged apart from each other. The corrugations of the wavy filtering sheet and the corrugations of the flat filtering sheet correspond to each other in amount, shape and position. The wavy filtering sheet and the flat filtering sheet are rolled into shape of a cylinder and are alternately stacked to form multiple layers of the wavy filtering sheet and layers of the flat filtering sheet. The axial sealing adhesive layers are respectively coated along the peaks of the wavy filtering sheet and are adhered to the flat filtering sheet. The end sealing adhesive layers are respectively coated on two surfaces of the wavy filtering sheet, are respectively disposed on two axial sides of the wavy filtering sheet, and are adhered with the flat filtering sheet.

The manufacturing method of the filter core has the following steps: (a) adhering a wavy filtering sheet and a flat filtering sheet, with the wavy filtering sheet for filtering suspended pollutants and having multiple corrugations and multiple peaks; with the corrugations of the wavy filtering sheet formed on the wavy filtering sheet and axially arranged apart from each other; with the peaks formed on the wavy filtering sheet and extending axially; with the peaks and the corrugations of the wavy filtering sheet perpendicular to each other in an extending direction; with the flat filtering sheet for filtering suspended pollutants and having multiple corrugations; with the corrugations of the flat filtering sheet formed on the flat filtering sheet and axially arranged apart from each other; with the corrugations of the wavy filtering sheet and the corrugations of the flat filtering sheet corresponding to each other in amount, shape and position; with multiple axial sealing adhesive layers respectively coated along the peaks of the wavy filtering sheet; with a first end sealing adhesive layer coated on one of two surfaces of the wavy filtering sheet and disposed on one of two axial sides of the wavy filtering sheet; and with the wavy filtering sheet and the flat filtering sheet adhered with each other; (b) slit-cutting the adhered filtering sheets, with the adhered filtering sheets cut into a desired length; (c) rolling the slit-cut filtering sheets, with a second end sealing adhesive layer coated on the other surface of the wavy filtering sheet and disposed on the other axial side of the wavy filtering sheet; and with the filtering sheets rolled into a shape of a cylinder to form a cylindrical filter core.

Since the wavy filtering sheet and flat filtering sheet respectively have multiple corrugations, channels formed between the filtering sheets also have corrugations formed on inner walls of the channels after the filtering sheets are adhered and rolled into a cylinder. The corrugations on the inner walls of the channels are also axially arranged apart from each other and form concave and convex portions. As a result, when fluid, such as air, axially moves in the channels, the suspended pollutants on the fluid may hit, gather and accumulate on the corrugations, thereby slowing the fluid flow and providing one more filtering process. In addition, the corrugations on the filtering sheets also increase a filtering area. To sum up, the filter core as described can enhance the filtering effect.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
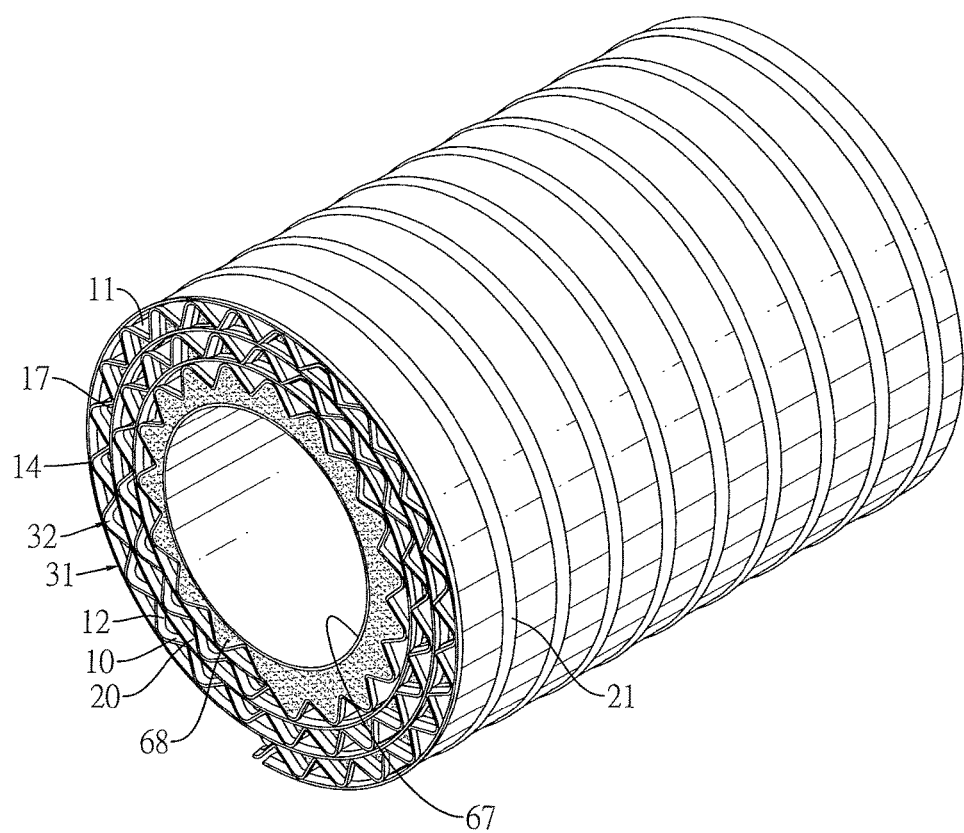
FIG. 1 is a perspective view of a first embodiment of a filter core in accordance with the present invention.
Figure 2:
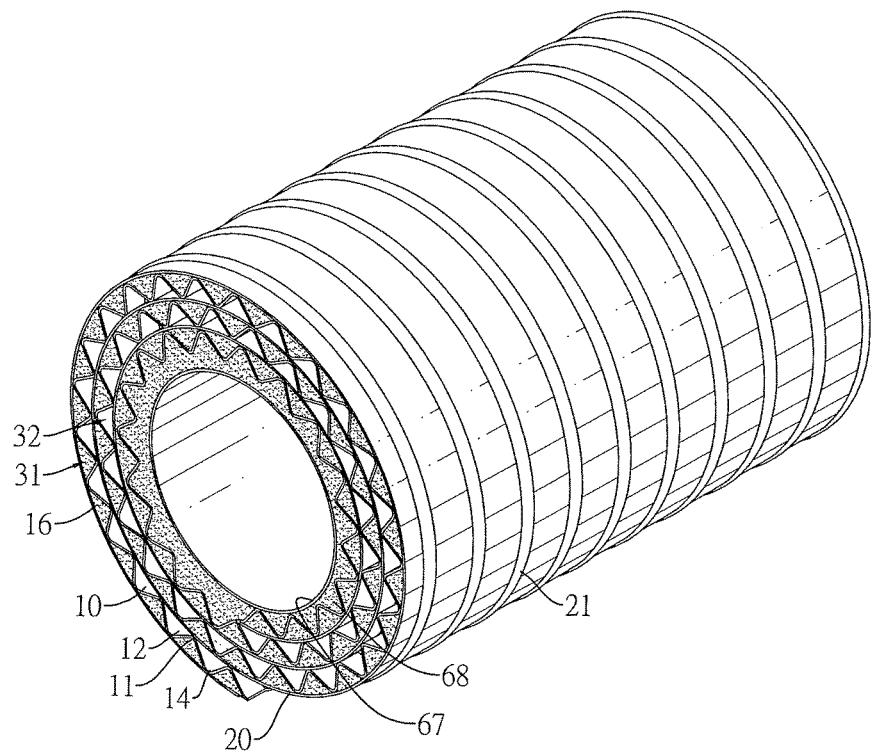
FIG. 2 is another perspective view of the filter core in FIG. 1.
Figure 3:
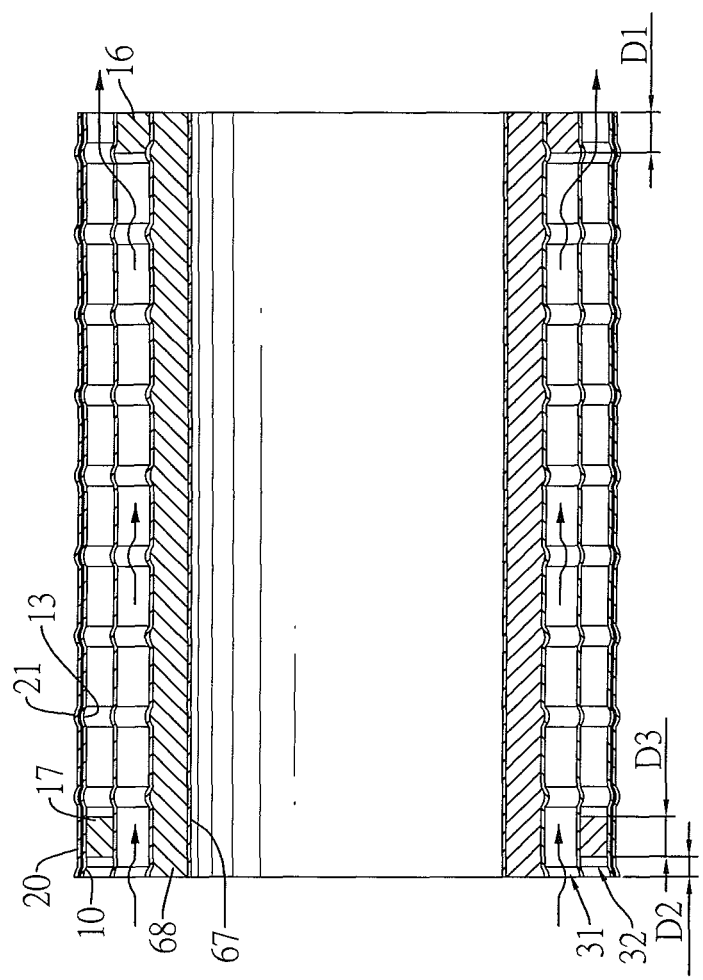
FIG. 3 is a side view in partial section of the filter core in FIG. 1.
Figure 4:
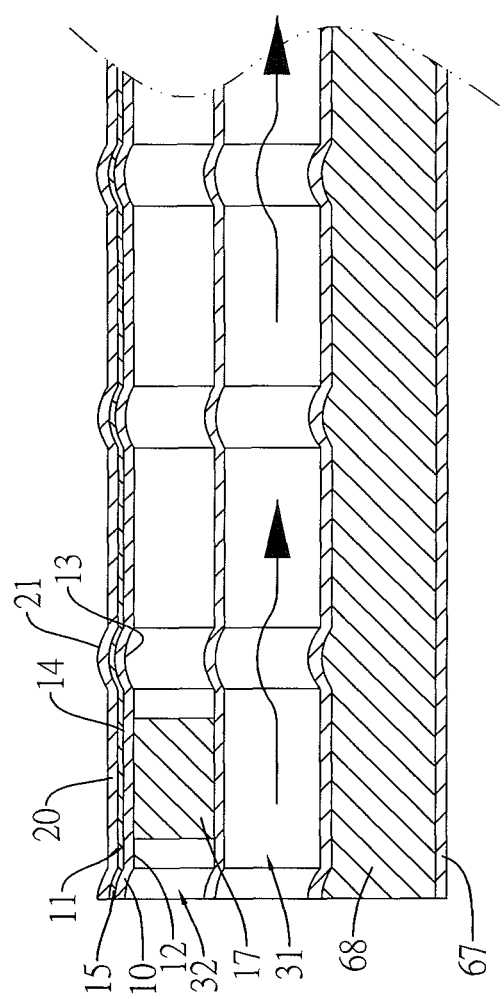
FIG. 4 is an enlarged side view in partial section of the filter core in FIG. 1.
Figure 5:
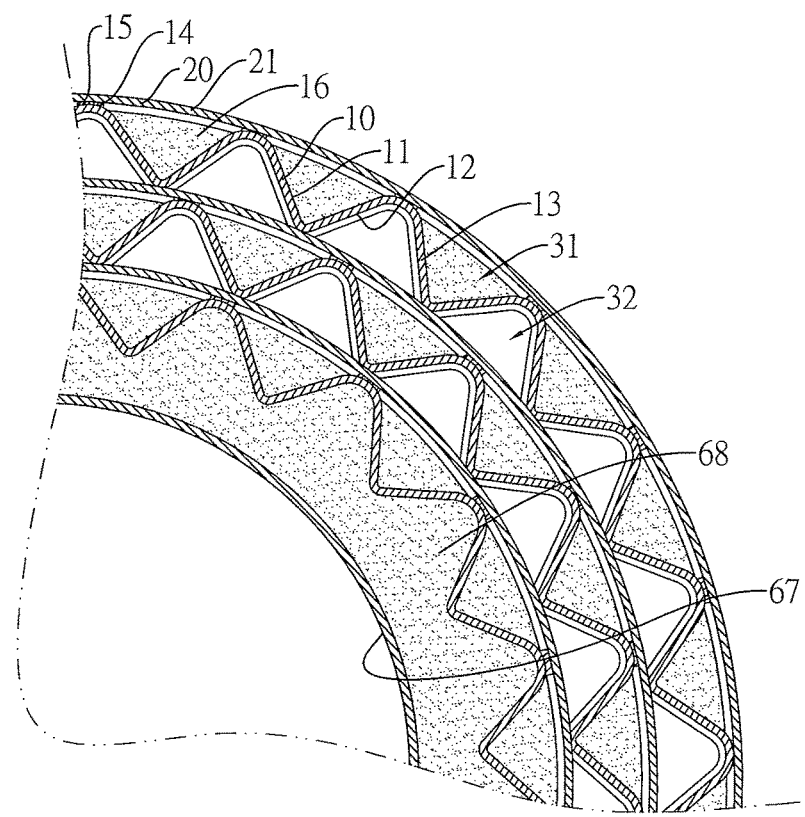
FIG. 5 is an enlarged end view in partial section of the filter core in FIG. 1.

With reference to FIGS. 1 to 5, a first embodiment of a filter core in accordance with the present invention comprises a wavy filtering sheet 10, a flat filtering sheet 20, multiple axial sealing adhesive layers 15, a first end sealing adhesive layer 16, and a second end sealing adhesive layer 17. The wavy filtering sheet 10 is for filtering suspended pollutants and has multiple corrugations 13 and multiple peaks 14. The corrugations 13 are formed on the wavy filtering sheet 10 and are axially arranged apart from each other. The peaks 14 are formed on the wavy filtering sheet 10 and extend axially. The peaks 14 and the corrugations 13 are perpendicular to each other in an extending direction. The flat filtering sheet 20 is for filtering suspended pollutants and has multiple corrugations 21. The corrugations 21 are formed on the flat filtering sheet 20 and are axially arranged apart from each other. The corrugations 13 of the wavy filtering sheet 10 and the corrugations 21 of the flat filtering sheet 20 correspond to each other in amount, shape and position as shown in FIGS. 4 and 5. The wavy filtering sheet 10 and the flat filtering sheet 20 are rolled into shape of a cylinder and are alternately stacked to form multiple layers of the wavy filtering sheet 10 and layers of the flat filtering sheet 20. The wavy filtering sheet 10 has a first surface 11 and a second surface 12. Multiple first channels 31 are formed between the first surface 11 and the flat filtering sheet 20, and multiple second channels 32 are formed between the second surface 12 and the flat filtering sheet 20. The corrugations 13 of the wavy filtering sheet 10 and the corrugations 21 of the flat filtering sheet 20 form concave and convex portions on inner walls of the first and second channels 31, 32. The axial sealing adhesive layers 15 are respectively coated along the peaks 14 on the first surface 11 of the wavy filtering sheet 10 and are adhered to the flat filtering sheet 20 as shown in FIGS. 4 and 5. The first end sealing adhesive layer 16 is coated between the first surface 11 of the wavy filtering sheet 10 and the flat filtering sheet 20 and is disposed on one of two axial sides of the wavy filtering sheet 10, thereby sealing the first channels 31 as shown in FIGS. 2 and 3 and securely adhering the first surface 11 of the wavy filtering sheet 10 with the flat filtering sheet 20. The second end sealing adhesive layer 17 is coated between the second surface 12 of the wavy filtering sheet 10 and the flat filtering sheet 20 and is disposed on the other axial side of the wavy filtering sheet 10, thereby sealing the second channels 32 as shown in FIGS. 1 and 3, and thereby securely adhering the second surface 12 of the wavy filtering sheet 10 with the flat filtering sheet 20.

In a preferred embodiment, with reference to FIGS. 2 and 3, an outer surface of the first end sealing adhesive layer 16 is aligned with a corresponding one of the axial sides of the wavy filtering sheet 10 and a corresponding axial side of the flat filtering sheet 20, and an axial length D1 of the first end sealing adhesive layer 16 ranges from 6 mm to 10 mm. With reference to FIGS. 1 and 3, a distance D2 between an outer surface of the second end sealing adhesive layer 17 and the corresponding axial side of the wavy filtering sheet 10 is less than 10 mm. An axial length D3 of the second end sealing adhesive layer 17 is 10 mm. The lengths and distance are by no means limited to the abovementioned.

In a preferred embodiment, the axial sealing adhesive layers 15 and the first and second end sealing adhesive layers 16, 17 are preferably, but not limited to, hot-melt adhesives or Polyurethane (PU) structural adhesives.

Figure 6:
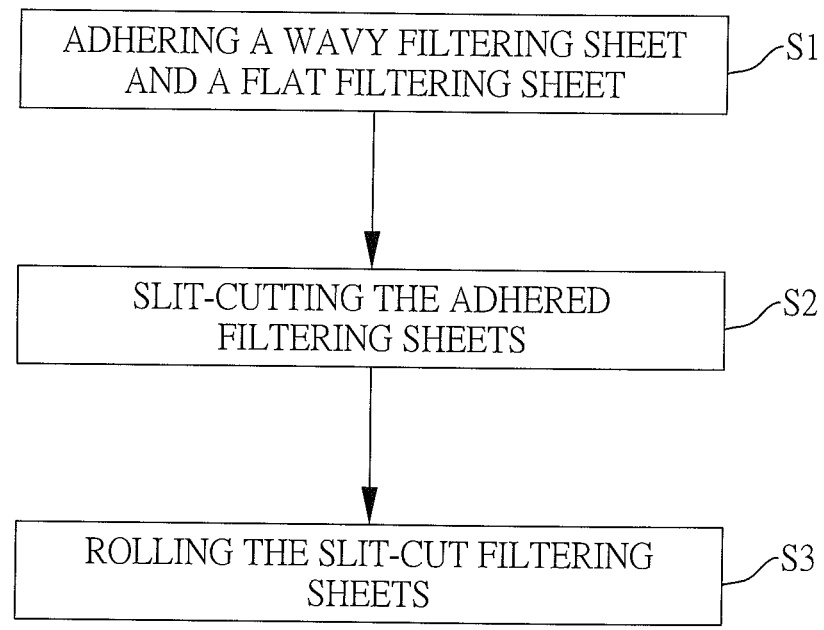
FIG. 6 is a flow chart of a first embodiment of a manufacturing method of a filter core in accordance with the present invention.

With reference to FIG. 6, a first embodiment of a manufacturing method of the filter core in accordance with the present invention comprises the following steps.

Figure 7:
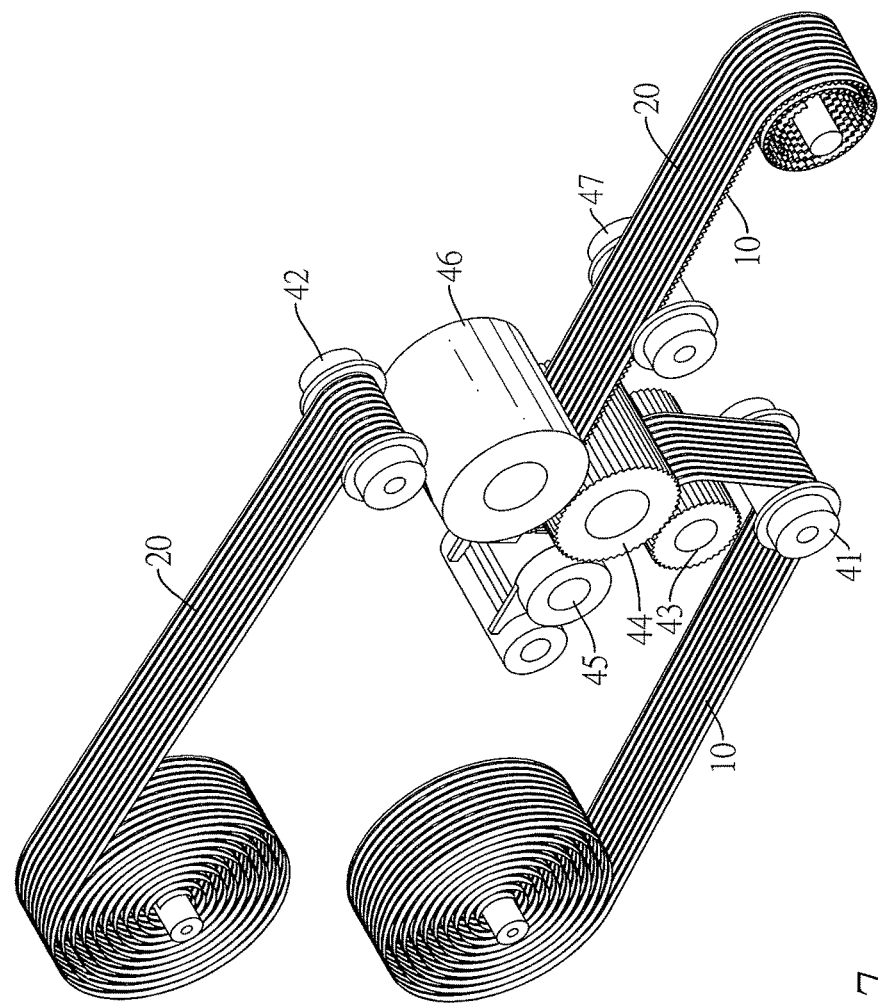
FIG. 7 is a perspective view of the manufacturing method of a filter core in FIG. 6, showing apparatus of step (S1)
Figure 8:
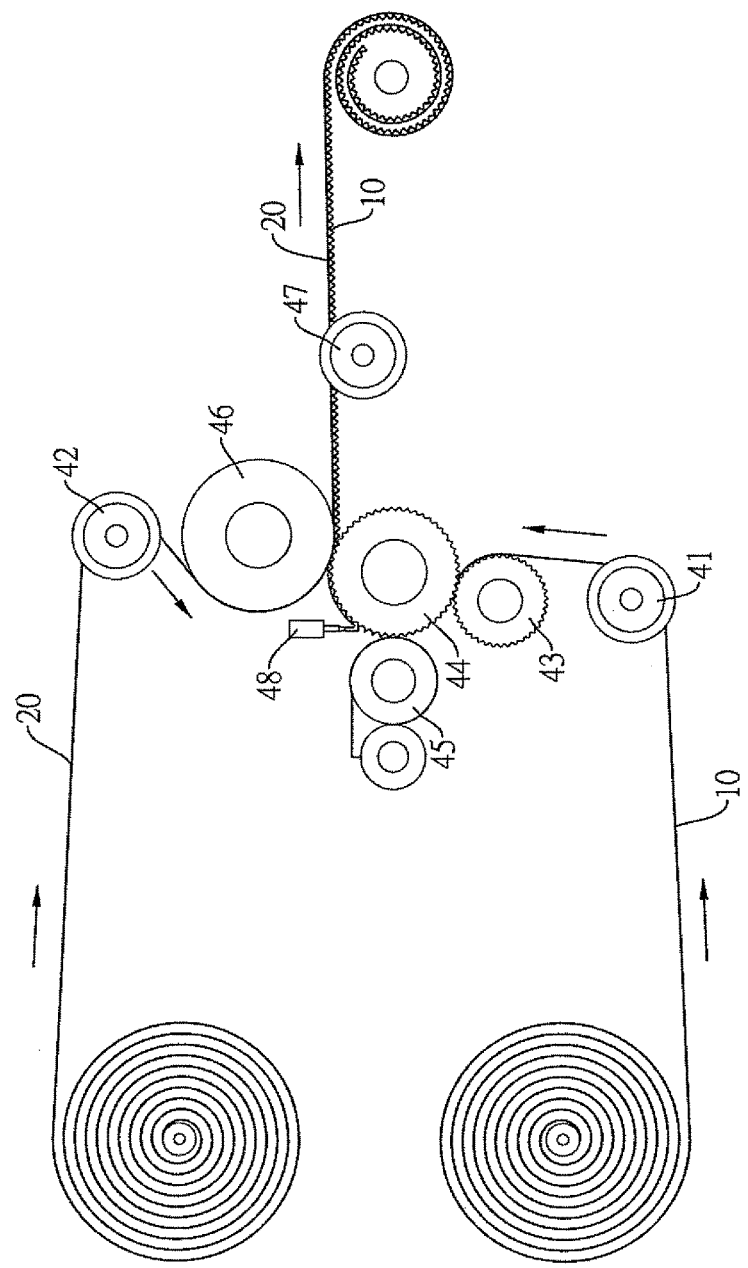
FIG. 8 is a side view of the manufacturing method of a filter core in FIG. 6, showing the apparatus of step (S1)
Figure 9:
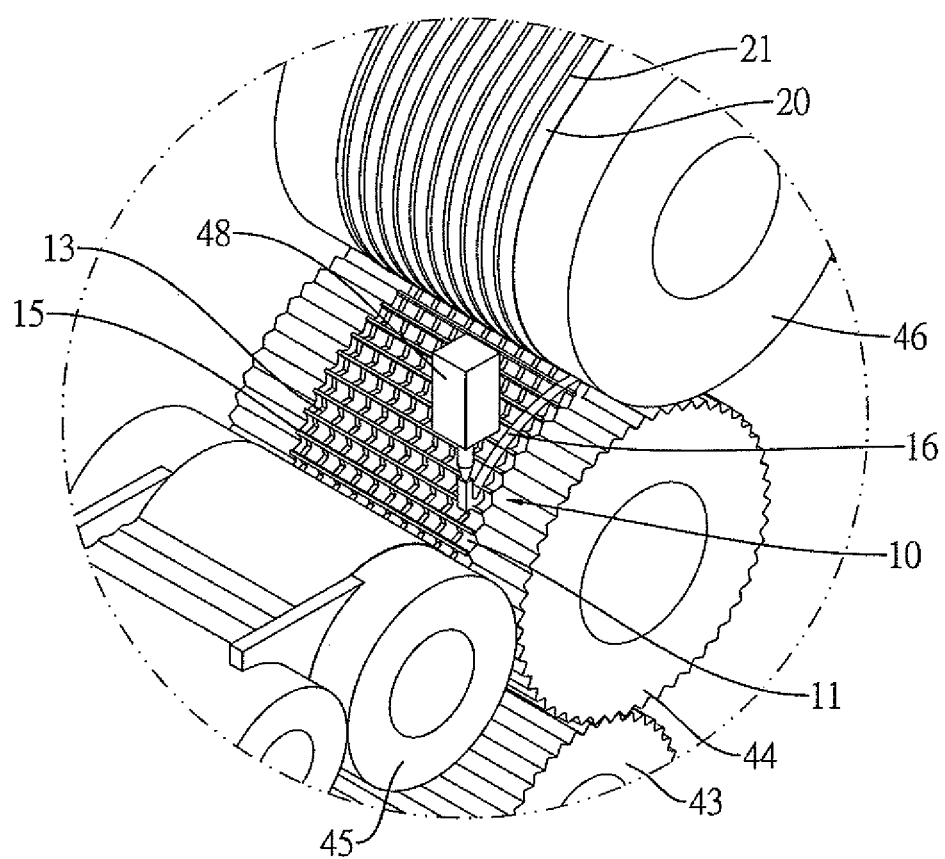
FIG. 9 is an enlarged partial view of the manufacturing method of a filter core in FIG. 6, showing the apparatus of step (S1)
Figure 10:
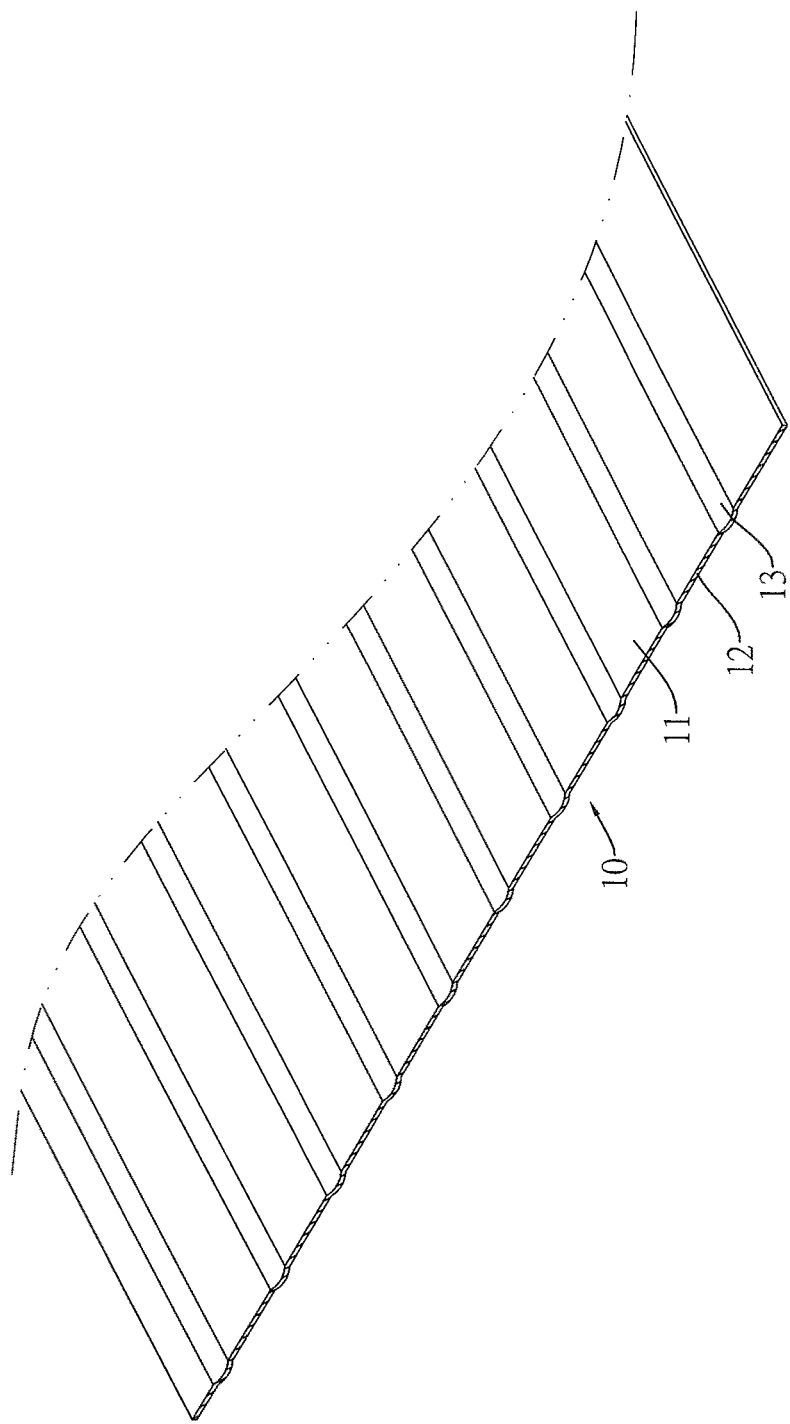
FIG. 10 is a perspective view in partial section of a wavy filtering sheet when not yet formed wavy-shaped in step (S1) of the manufacturing method of a filter core in FIG. 6.
Figure 11:
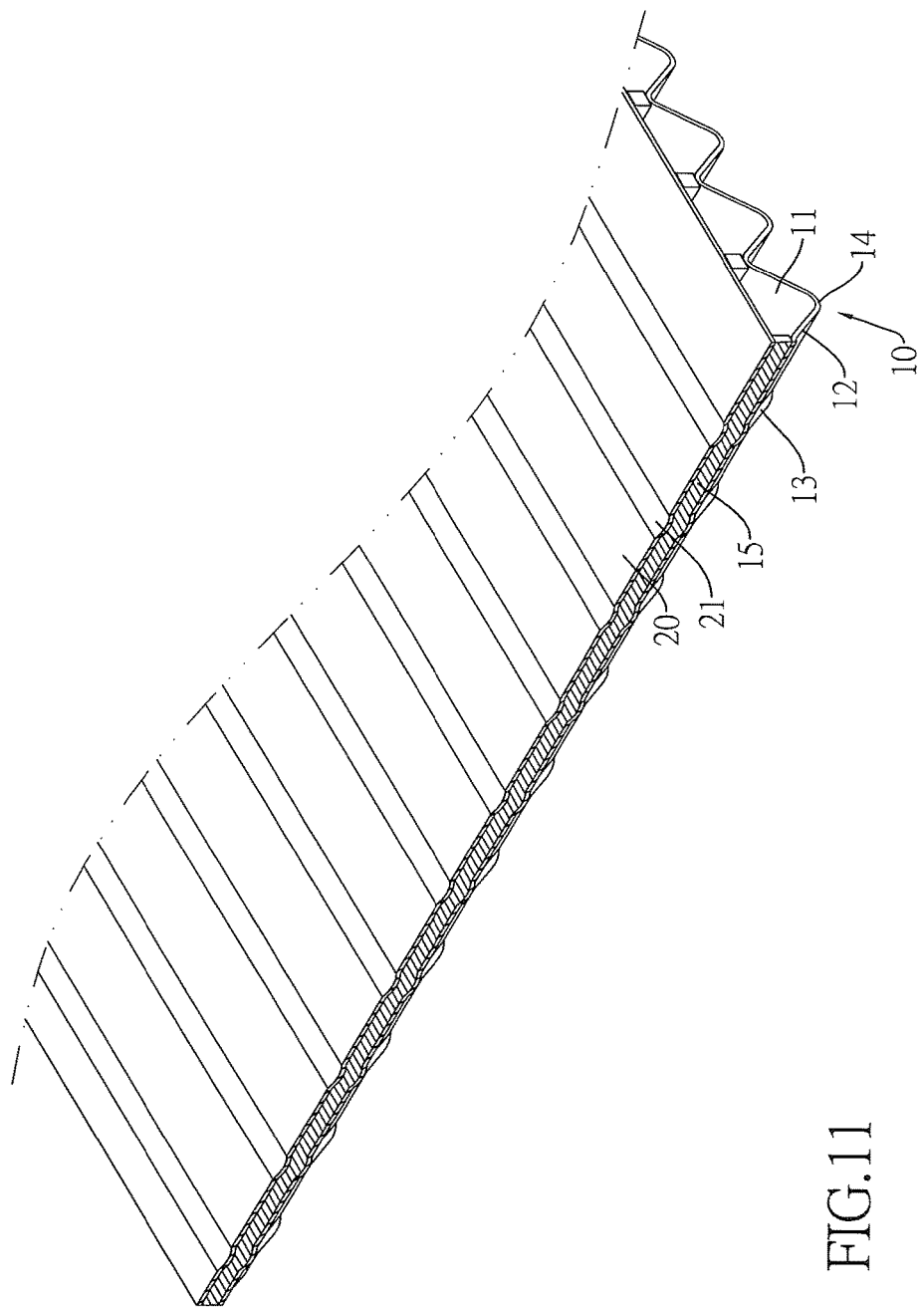
FIG. 11 is a perspective view in partial section of the wavy filtering sheet adhered with a flat filtering sheet in step (S1) of the manufacturing method of a filter core in FIG. 6.
Figure 12:
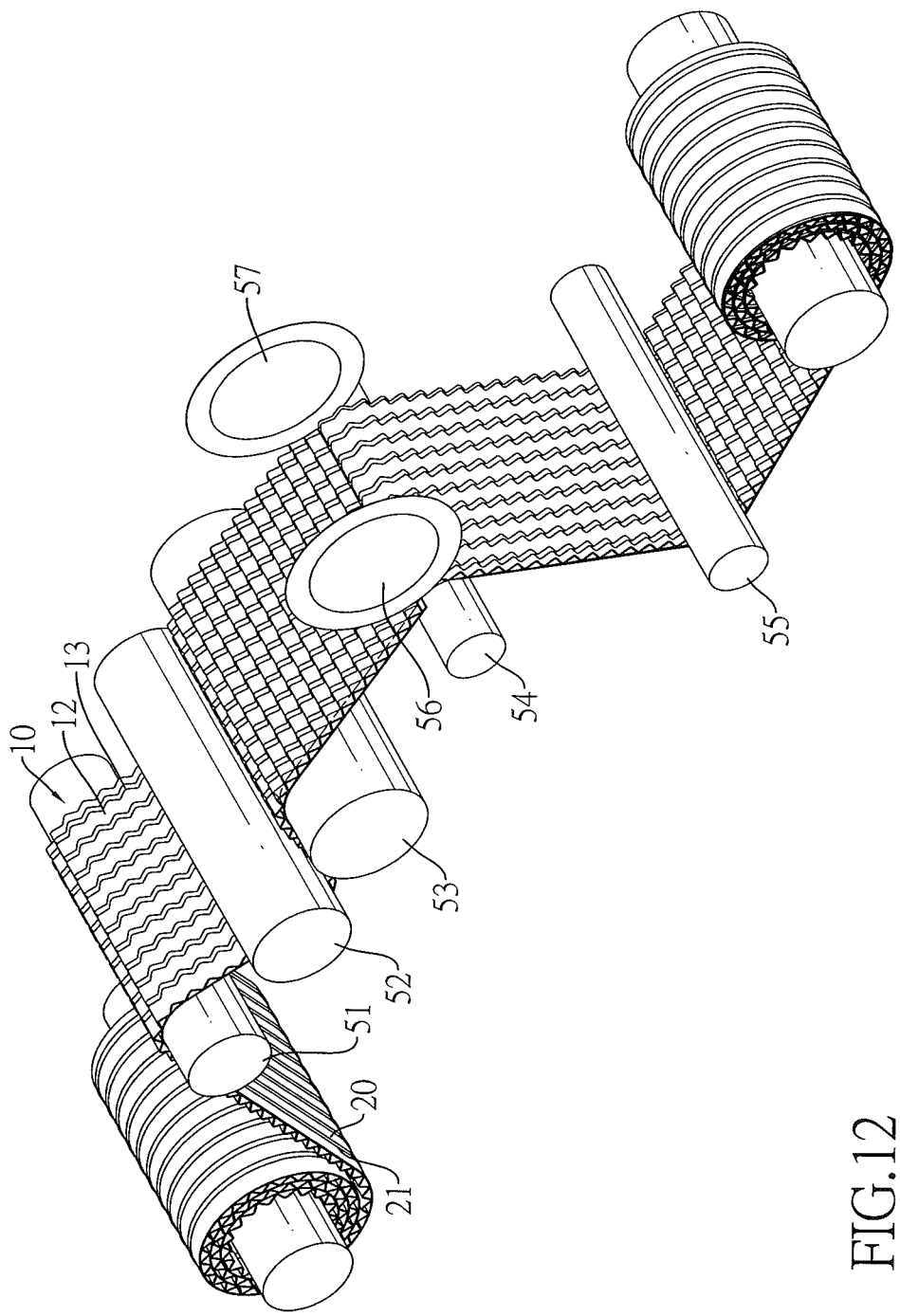
FIG. 12 is a perspective view of the manufacturing method of a filter core in FIG. 6, showing apparatus of step (S2)

The first step (S1) is to adhere a wavy filtering sheet 10 and a flat filtering sheet 20. With reference to FIGS. 7 to 9, the wavy filtering sheet 10 is for filtering suspended pollutants and has a first surface 11, a second surface 12, and multiple corrugations 13. The corrugations 13 of the wavy filtering sheet 10 are formed on the wavy filtering sheet 10 and are axially arranged apart from each other. The wavy filtering sheet 10 is not yet formed wavy-shaped at this time as shown in FIG. 10. The flat filtering sheet 20 is for filtering suspended pollutants and has multiple corrugations 21. The corrugations 21 of the flat filtering sheet 20 are formed on the flat filtering sheet 20 and are axially arranged apart from each other. The corrugations 13 of the wavy filtering sheet 10 and the corrugations 21 of the flat filtering sheet 20 correspond to each other in amount, shape and position. The wavy filtering sheet 10 in sequence passes a first driving roller 41, passes a lower shaping roller 43 to be pre-heated first, and passes between the lower shaping roller 43 and an upper shaping roller 44 to be formed wavy-shaped and has multiple peaks 14 that extend axially. The peaks 14 and the corrugations 13 of the wavy filtering sheet 10 are perpendicular to each other in an extending direction. Afterwards, the wavy filtering sheet 10 passes a gluing roller 45. Glues on the gluing roller 45 are coated on the peaks 14 of the first surface 11 of the wavy filtering sheet 10 to form axial sealing adhesive layers 15. Then, a gluing gun 48 coats a first end sealing adhesive layer 16 on the first surface 11 of the wavy filtering sheet 10, and the first end sealing adhesive layer 16 is disposed on one of two axial sides of the wavy filtering sheet 10. Afterwards, the wavy filtering sheet 10 and the flat filtering sheet 20 together pass between the upper shaping roller 44 and a pressing roller 46 to be tightly pressed and adhered with each other as shown in FIG. 11. The pressing roller 46 simultaneously cools the adhered filtering sheets 10, 20, and rapidly cools the axial sealing adhesive layers 15 and the first end sealing adhesive layer 16. At this time, multiple first channels 31 are formed between the first surface 11 and the flat filtering sheet 20, and the corrugations 13 of the wavy filtering sheet 10 and the corrugations 21 of the flat filtering sheet 20 form concave and convex portions on inner walls of the first channels 31. The adhered filtering sheets 10, 20 are moved by a toothed driving roller 47, and are finally rolled into a shape of a cylinder.

In addition, the first driving roller 41, the second driving roller 42 and the toothed driving roller 47 not only can move the filtering sheets 10, 20, but also can guide and prevent the filtering sheets 10, 20 from transverse deviation.

Figure 13:
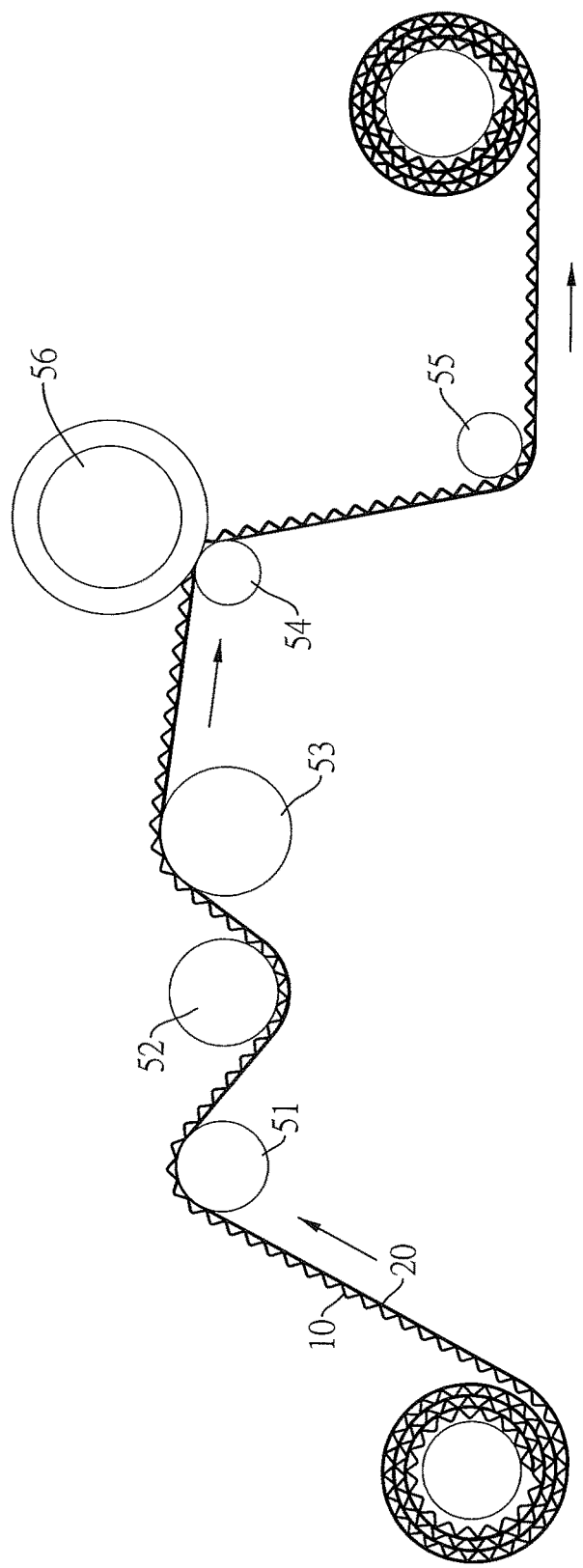
FIG. 13 is a side view of the manufacturing method of a filter core in FIG. 6, showing the apparatus of step (S2)
Figure 14:
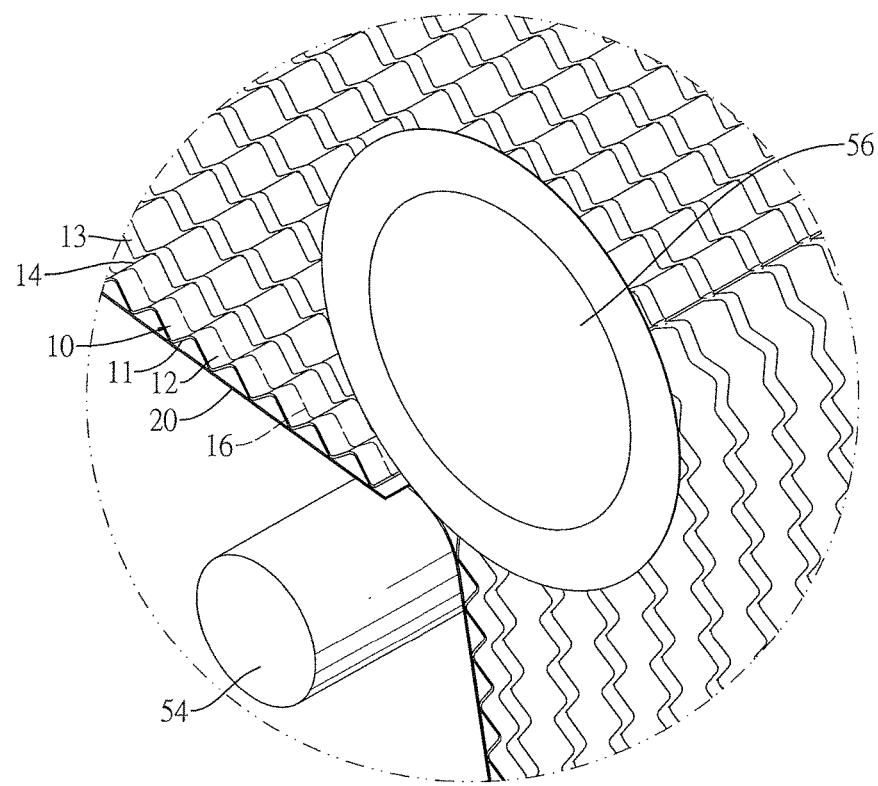
FIG. 14 is an enlarged partial view of the manufacturing method of a filter core in FIG. 6, showing the apparatus of step (S2)
Figure 15:
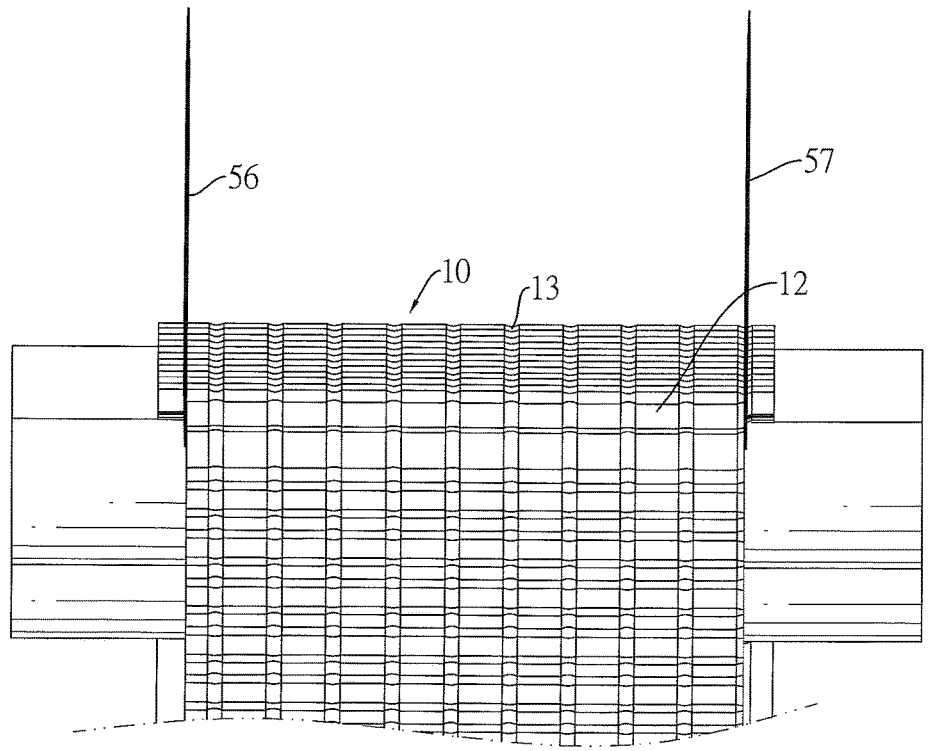
FIG. 15 is a partial operational view of the manufacturing method of a filter core in FIG. 6, showing the apparatus of step (S2)

The second step (S2) is to slit-cut the adhered filtering sheets 10, 20. With reference to FIGS. 12 to 15, the adhered and rolled filtering sheets 10, 20 are pulled out and expanded. The adhered filtering sheets 10, 20 in sequence pass a first front guiding roller 51, a third driving roller 52, a fourth driving roller 53, a first upper guiding roller 54, and a first lower guiding roller 55. The first lower guiding roller 55 is positioned lower than the first upper guiding roller 54, such that the adhered filtering sheets 10, 20 shift direction to incline downward when passing the first upper guiding roller 54. The adhered filtering sheets 10, 20 are cut at a position where the adhered filtering sheets 10, 20 shift direction as shown in FIG. 13. The adhered filtering sheets 10, 20 are cut by two rotating blades 56, 57 that are axially arranged apart from each other. Tangential velocities of the rotating blades 56, 57 are larger than a moving speed of the adhered filtering sheets 10, 20, thereby making edges of the filtering sheets 10, 20 evenly cut and thereby preventing said edges from deformation. An axial distance between the rotating blades 56, 57 is equal to an axial length of the filter core, and said axial distance is a desired length of the adhered filtering sheets 10, 20. The rotating blades 56 cut the adhered filtering sheets 10, 20 at a position along the first end sealing adhesive layer 16 to cut off part of the first end sealing adhesive layer 16, such that an outer surface of the remaining first end sealing adhesive layer 16 after cutting is aligned with a corresponding one of the axial sides of the wavy filtering sheet 10 and a corresponding axial side of the flat filtering sheet 20. In a preferred embodiment, an axial length D1 of the remaining first end sealing adhesive layer 16 after cutting is preferably, but not limited to, from 6 mm to 10 mm. After the adhered filtering sheets 10, 20 are cut, the cut filtering sheets 10, 20 are rolled into a shape of a cylinder again.

Figure 16:
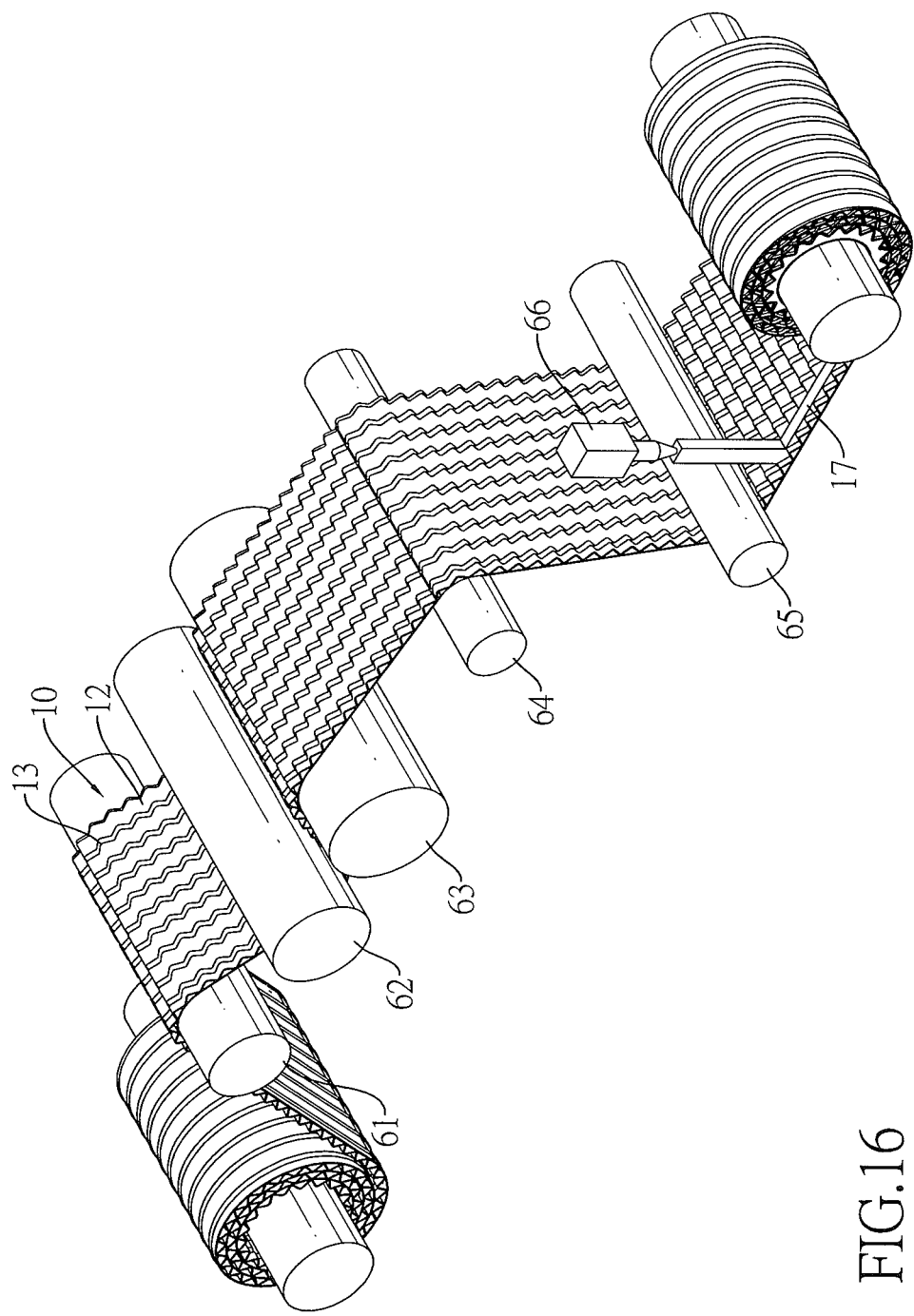
FIG. 16 is a perspective view of the manufacturing method of a filter core in FIG. 6, showing the apparatus of step (S3)
Figure 17:
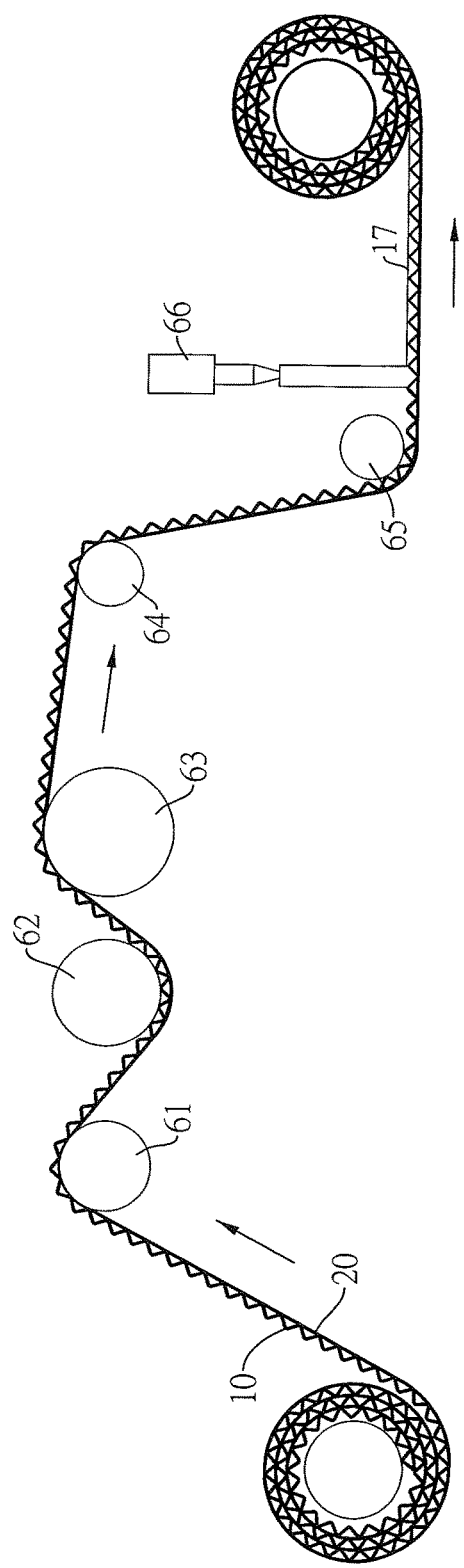
FIG. 17 is a side view of the manufacturing method of a filter core in FIG. 6, showing the apparatus of step (S3)
Figure 18:
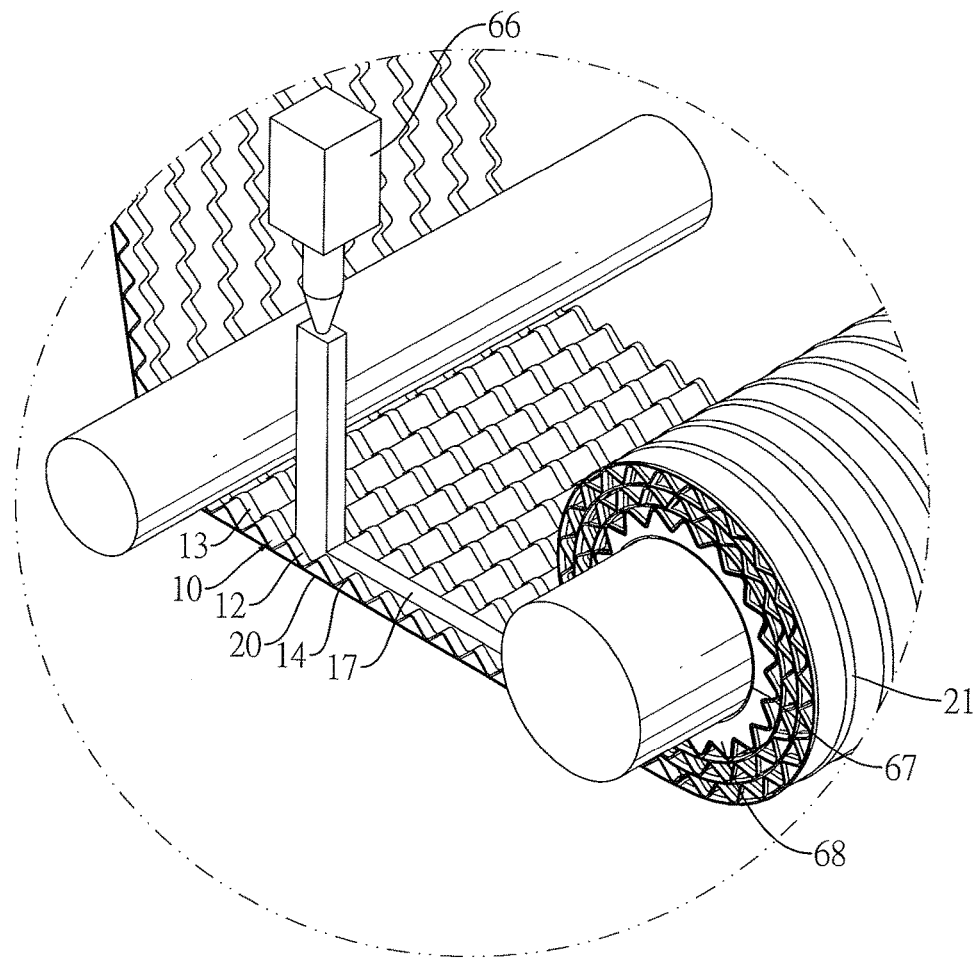
FIG. 18 is an enlarged partial view of the manufacturing method of a filter core in FIG. 6, showing the apparatus of step (S3)

The third step (S3) is to roll the slit-cut filtering sheets 10, 20. With reference to FIGS. 16 to 18, the cut and rolled filtering sheets 10, 20 are pulled out and expanded. The cut filtering sheets 10, 20 in sequence pass a second front guiding roller 61, a fifth driving roller 62, a sixth driving roller 63, a second upper guiding roller 64 and a second lower guiding roller 65. Then, a gluing gun 66 coats a second end sealing adhesive layer 17 on the second surface 12 of the wavy filtering sheet 10, and the second end sealing adhesive layer 17 is disposed on the other axial side of the wavy filtering sheet 10. In a preferred embodiment, a distance D2 between an outer surface of the second end sealing adhesive layer 17 and the corresponding axial side of the wavy filtering sheet 10 is less than 10 mm. An axial length D3 of the second end sealing adhesive layer 17 is 10 mm. The length and distance are by no means limited to the abovementioned. Afterwards, the filtering sheets 10, 20 are rolled around a circular tube 67, and an annular adhesive layer 68 is coated between the circular tube 67 and the second surface 12 of the wavy filtering sheet 10 to securely adhere the circular tube 67 and the wavy filtering sheet 10 as shown in FIG. 3. Finally, the filtering sheets 10, 20 are rolled into a shape of a cylinder to form a cylindrical filter core. At this time, multiple second channels 32 are formed between the second surface 12 and the flat filtering sheet 20, and the corrugations 13 of the wavy filtering sheet 10 and the corrugations 21 of the flat filtering sheet 20 form concave and convex portions on inner walls of the second channels 32.

With reference to FIGS. 3 and 4, when the filter core as described is in use, since the wavy filtering sheet 10 and, flat filtering sheet 20 respectively have multiple corrugations 13, 21, the channels 31, 32 formed between the filtering sheets 10, 20 also have corrugations 13, 21 formed on inner walls of the channels 31, 32. The corrugations 13, 21 on the inner walls of the channels 31, 32 are also axially arranged apart from each other and form the concave and convex portions. As a result, when fluid, such as air, axially moves in the channels 31, 32, the fluid flows curvedly along the concave and convex portions on the inner walls of the channels 31, 32. During movement, the suspended pollutants on the fluid may hit, gather and accumulate on the corrugations 13, 21, thereby slowing the fluid flow and providing one more filtering process. In addition, when the fluid hits the end sealing adhesive layers 16, 17 and passes through the wavy filtering sheet 10 or the flat filtering sheet 20, the corrugations 13, 21 on the filtering sheets 10, 20 also increase a filtering area. To sum up, the filter core as described can enhance the filtering effect.

Moreover, the corrugations 13, 21 on the filtering sheets 10, 20 also can strengthen the structure of the filer core, thereby preventing the filter core from deformation when getting hit.

Furthermore, the axial sealing adhesive layers 15 are coated along the peaks 14 of the wavy filtering sheet 10, thereby preventing the corrugations 13, 21 from interfering with the adhesion between the filtering sheets 10, 20.

In the second step (S2), the rotating blades 56, 57 cut the edges of the filtering sheets 10, 20 evenly and prevent said edges from deformation. Therefore, either when the filtering sheets are rolled into a shape of a cylinder for the next step, or when the filtering sheets are rolled into a shape of a cylinder to form the cylindrical filter core, there is no need to align the axial edges, and the axial edges still can be even and avoid deviation.

In another preferred embodiment, in the second step (S2), the rotating blade can cut the adhered filtering sheets at a position in an axial outer side of the first end sealing adhesive layer rather than at a position along the first end sealing adhesive layer, thereby making the first end sealing adhesive layer maintain an axial thickness, lowering the axial length of the filter core, and maximizing the filter core.

In another preferred embodiment, in the second step (S2), the adhered filtering sheets may be cut by a single rotating blade, and the rotating blade may cut the adhered filtering sheets at a position in an axial outer side of the first end sealing adhesive layer or at a position along the first end sealing adhesive layer.

In another preferred embodiment, in the second step (S2), the adhered filtering sheets may be cut by other means rather than rotating blade, and the filter core also can effectively enhance the filtering by using filtering sheets with corrugations.

In another preferred embodiment, in the second step (S2), the adhered filtering sheets may be cut at a position where the adhered filtering sheets move linearly rather than at a position where the adhered filtering sheets shift direction.

In another preferred embodiment, the filtering sheets may not be rolled into a shape of a cylinder after being adhered and directly proceed to step (S2). The filtering sheets may not be rolled into a shape of a cylinder after cutting, and directly proceed to step (S3).

Figure 19:
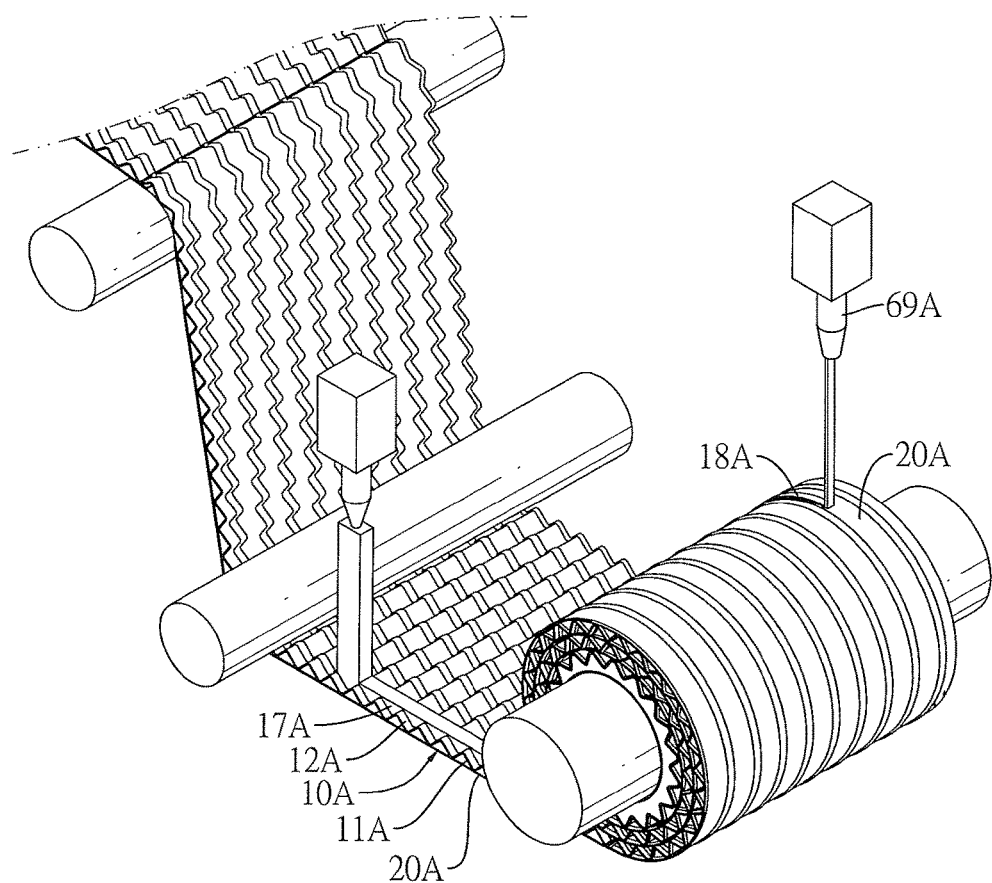
FIG. 19 is an enlarged partial view of a second embodiment of a manufacturing method of a filter core in accordance with the present invention, showing the apparatus of step (S3)
Figure 20:
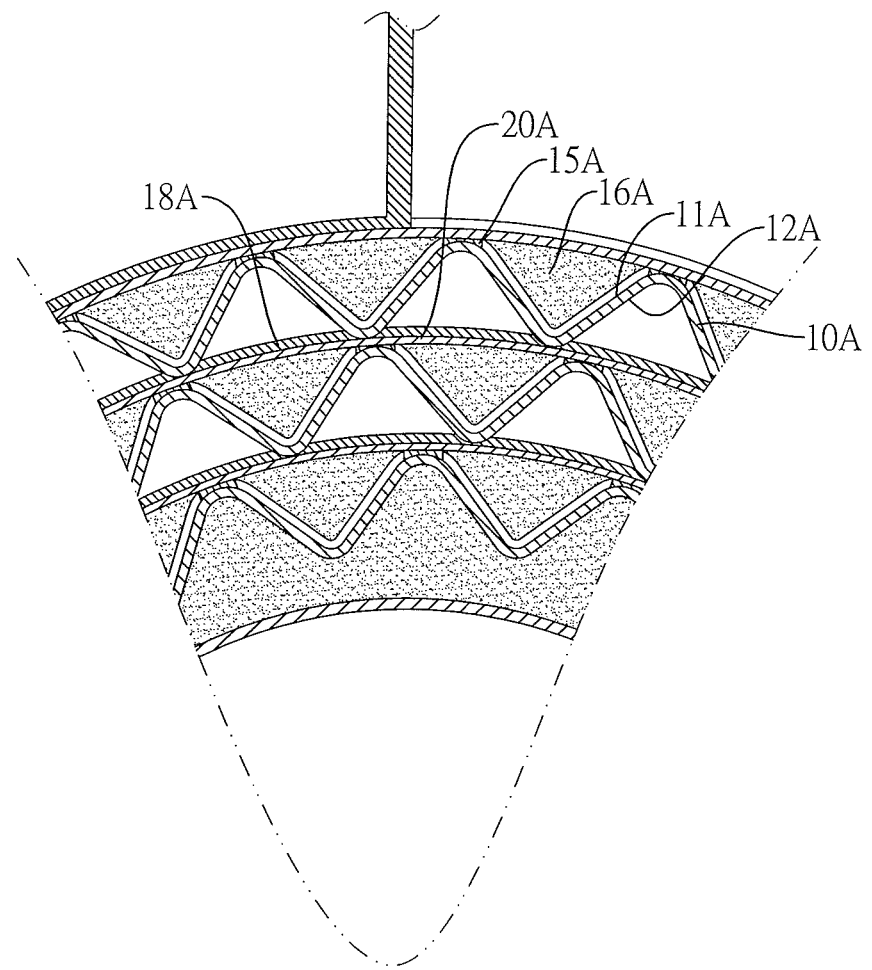
FIG. 20 is an enlarged end view in partial section of a second embodiment of a filter core in accordance with the present invention.

With reference to FIGS. 19 and 20, a second embodiment of the filter core in accordance with the present invention is substantially similar to the first embodiment of the filter core mentioned above, but the second embodiment further has a connecting adhesive layer 18A. The connecting adhesive layer 18A is coated between the second surface 12A of the wavy filtering sheet 10A and the flat filtering sheet 20A, and is disposed adjacent to the first end sealing adhesive layer 16A.

A second embodiment of the manufacturing method of the filter core in accordance with the present invention is substantially similar to the first embodiment of the manufacturing method, but in the second embodiment, in the third step (S3), when the filtering sheets 10A, 20A are rolled, a gluing gun 69A coats a connecting adhesive layer 18A on an outer surface of the flat filtering sheet 20A, and the connecting adhesive layer 18A is disposed adjacent to the first end sealing adhesive layer 16A. Thus, the connecting adhesive layer 18A is adhered with the second surface 12A of the wavy filtering sheet 10A.

Therefore, the first surface 11A of the wavy filtering sheet 10A is adhered with the flat filtering sheet 20A by the axial sealing adhesive layer 15A and the first end sealing adhesive layer 16A. As for the second surface 12A, the second surface 12A is adhered with the flat filtering sheet 20A by the second end sealing adhesive layer 17A and the connecting adhesive layer 18A, which are respectively disposed in two axial sides of the filter core, thereby securely connecting the second surface 12A and the flat filtering sheet 20A together.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A manufacturing method of a filter core comprising:
   (a) adhering a wavy filtering sheet and a flat filtering sheet, wherein the wavy filtering sheet is for filtering suspended pollutants and has multiple corrugations and multiple peaks; wherein the multiple corrugations of the wavy filtering sheet are formed on the wavy filtering sheet and are axially arranged apart from each other; wherein the multiple peaks are formed on the wavy filtering sheet and extend axially; wherein the multiple peaks and the multiple corrugations of the wavy filtering sheet are perpendicular to each other in an extending direction; wherein the flat filtering sheet is for filtering suspended pollutants and has multiple corrugations; wherein the multiple corrugations of the flat filtering sheet are formed on the flat filtering sheet and are axially arranged apart from each other; wherein the multiple corrugations of the wavy filtering sheet and the multiple corrugations of the flat filtering sheet correspond to each other in amount, shape and position; wherein multiple axial sealing adhesive layers are respectively coated along the multiple peaks of the wavy filtering sheet; wherein a first end sealing adhesive layer is coated on a first surface of the wavy filtering sheet and is disposed on one of two axial sides of the wavy filtering sheet; wherein the wavy filtering sheet and the flat filtering sheet are adhered with each other, wherein multiple first channels are formed between the first surface and the flat filtering sheet, and wherein the multiple corrugations of the wavy filtering sheet and the multiple corrugations of the flat filtering sheet form concave and convex portions on inner walls of the first channels;
   (b) slit-cutting the adhered filtering sheets, wherein the adhered filtering sheets are cut into a desired length, wherein in slit-cutting, the adhered filtering sheets pass a first upper guiding roller and a first lower guiding roller in sequence, wherein the adhered filtering sheets shift direction to incline downward when passing the first upper guiding roller, and wherein the adhered filtering sheets are cut at a position where the adhered filtering sheets shift direction; and
   (c) rolling the slit-cut filtering sheets, wherein a second end sealing adhesive layer is coated on a second surface of the wavy filtering sheet and is disposed on another of the two axial sides of the wavy filtering sheet; wherein the filtering sheets are rolled into a shape of a cylinder to form a cylindrical filter core, wherein multiple second channels are formed between the second surface and the flat filtering sheet, and wherein the multiple corrugations of the wavy filtering sheet and the multiple corrugations of the flat filtering sheet form concave and convex portions on inner walls of the second channels.

2. The manufacturing method of the filter core as claimed in claim 1, wherein in slit-cutting, the adhered filtering sheets are cut by two rotating blades that are axially arranged apart from each other; and wherein tangential velocities of the two rotating blades are larger than a moving speed of the adhered filtering sheets.

3. The manufacturing method of the filter core as claimed in claim 1, wherein in slit-cutting, the adhered filtering sheets are cut by a rotating blade; wherein a tangential velocity of the rotating blade is larger than a moving speed of the adhered filtering sheets.

4. The manufacturing method of the filter core as claimed in claim 1, wherein in slit-cutting, the adhered filtering sheets are cut at a position along the first end sealing adhesive layer, and wherein an axial length of the remaining first end sealing adhesive layer after cutting ranges from 6 mm to 10 mm.

5. The manufacturing method of the filter core as claimed in claim 1, wherein in rolling, an axial length of the second end sealing adhesive layer is 10 mm.

6. The manufacturing method of the filter core as claimed in claim 1, wherein in rolling, a distance between an outer surface of the second end sealing adhesive layer and the corresponding axial side of the wavy filtering sheet is less than 10 mm.

7. The manufacturing method of the filter core as claimed in claim 1, wherein:
in adhering, after the wavy filtering sheet and the flat filtering sheet are adhered with each other, the adhered filtering sheets are rolled into a shape of a cylinder;
in slit-cutting, the adhered and rolled filtering sheets are pulled out and expanded to be cut, and after cutting, the cut filtering sheets are again rolled into the shape of the cylinder; and
in rolling, the cut and rolled filtering sheets are pulled out and expanded to be coated on the second end sealing adhesive layer.

8. The manufacturing method of the filter core as claimed in claim 1, wherein in adhering, the wavy filtering sheet passes a lower shaping roller to be pre-heated first, and then passes between the lower shaping roller and an upper shaping roller to be formed wavy-shaped; wherein afterwards, the wavy filtering sheet passes a gluing roller to be coated on the axial sealing adhesive layers; wherein the wavy filtering sheet and the flat filtering sheet together pass between the upper shaping roller and a pressing roller to be tightly pressed and adhered with each other; and wherein the pressing roller cools the adhered filtering sheets simultaneously.

9. The manufacturing method of the filter core as claimed in claim 1, wherein rolling, a connecting adhesive layer is coated on an outer surface of the flat filtering sheet and is disposed adjacent to the first end sealing adhesive layer when the filtering sheets are rolled, and wherein the connecting adhesive layer is adhered with the second surface of the wavy filtering sheet.

10. The manufacturing method of the filter core as claimed in claim 1, wherein when fluid flows in the first and second channels, the fluid flows curvedly along the concave and convex portions on the inner walls of the first and second channels.

* * * * *